United States Patent Office 2,968,952
Patented Jan. 24, 1961

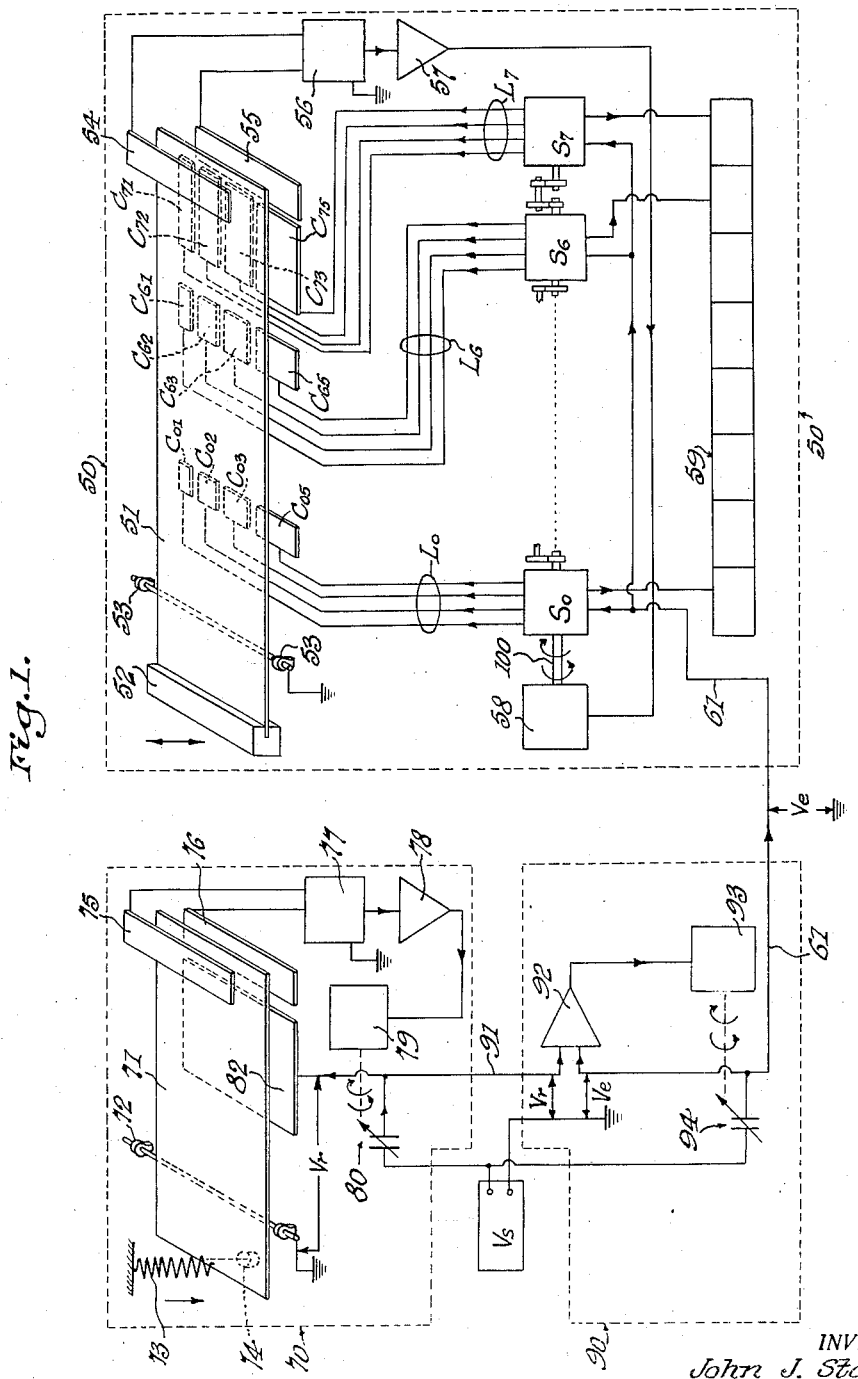

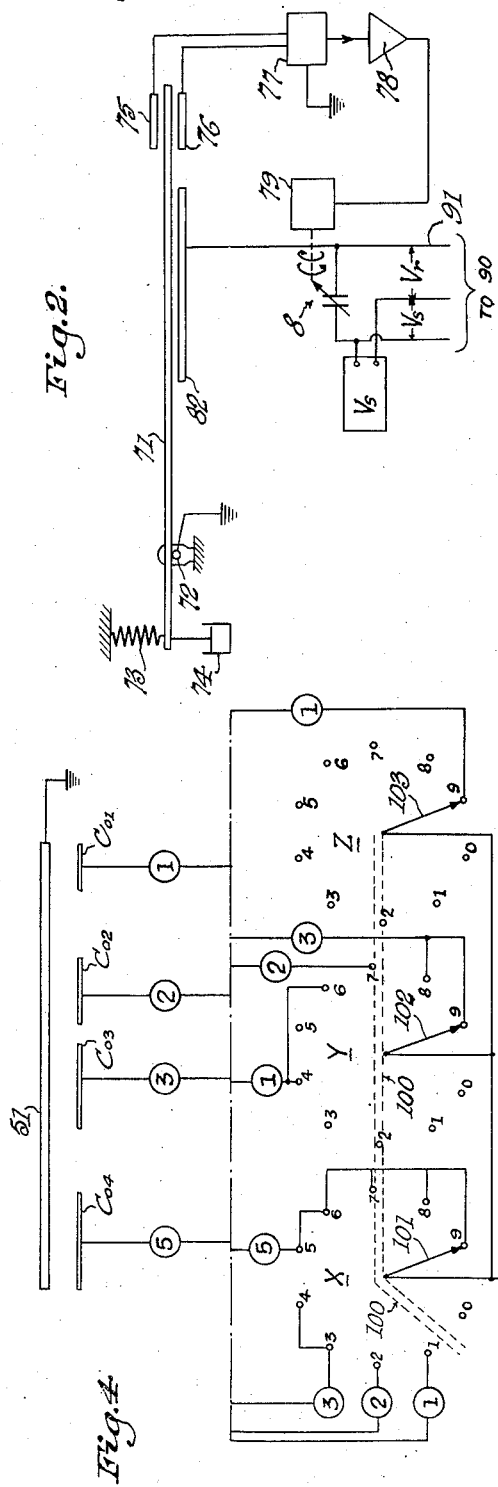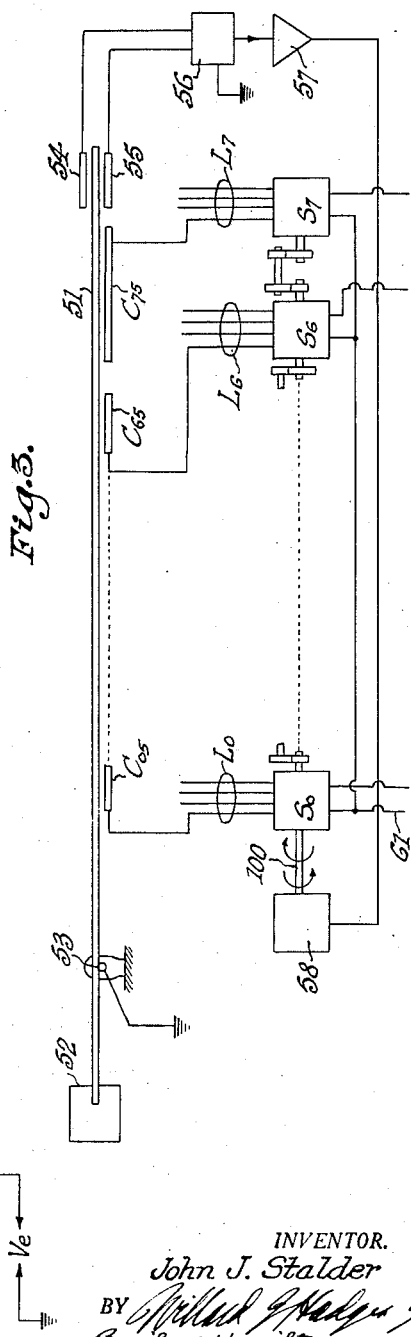

2,968,952

FORCE MEASUREMENT SYSTEM

John J. Stalder, West Caldwell, N.J., assignor to the United States of America as represented by the Secretary of the Army Filed Sept. 21, 1959, Ser. No. 841,421

7 Claims. (Cl. 73—517)

This invention relates to systems for exerting a measurable force and particularly to force measurement systems especially adapted to be used in accelerometers for measuring the acceleration of a vehicle by the method of counteracting and thereby measuring the force required to accelerate a proof mass carried by the accelerating vehicle.

Extremely accurate force measurement systems constitute the fundamental components in accelerometers used in many inertial navigation systems, inertial guidance systems, and the like. One basic method of measuring the acceleration of a prime structure, such as a vehicle, is to measure the force required to accelerate a proof mass at the same rate the prime structure is being accelerated and then calculate the common acceleration by well known and accepted formulas. By way of illustration, a simple device using this method is a spring connected at one end to a proof mass and at the other end to the prime structure or vehicle whose acceleration is to be determined. Acceleration of the prime structure causes compression or extension of the spring which exerts a force upon the proof mass tending to cause it to accelerate in the same direction as the prime structure. The magnitude of the accelerating force exerted upon the proof mass may be determined on the basis of the distance the spring extends or contracts relative to a reference point. The spring force is in actuality the sole force causing acceleration of the proof mass, and is an index of the acceleration impressed on the proof mass and hence on the prime structure. If rather than attaching a proof mass to the prime structure by means of a spring, the proof mass is constructed in the form of an unbalanced beam supported on a pivot by the prime structure, the pivoted beam will react to impressed accelerations by tending to rotate about the pivot axis because of its unbalance. The force or torque tending to rotate the unbalanced beam is proportional to the acceleration of the proof mass and hence of the prime structure. An advantageous method of measuring the torque due to acceleration is to measure the counterbalancing force required to prevent rotation of the unbalanced beam and maintain the beam in a reference null or static position. This method has the advantage that the balance remains in position to continuously measure force over a period of time. Therefore, by continuously measuring the force and computing the acceleration over a period of time, and knowing the initial velocity of the system at a reference point and reference time, the distances the system has traveled from the reference point in the direction in which the accelerometer is sensitive can be computed by the formula:

$$S = V_0 t + \int_0^t \int_0^t a \, dt^2$$

wherein $V_0$ is the initial velocity of the system in the sensitive direction, $t$ the elapsed time of travel, and $a$ the instantaneous acceleration in the sensitive direction.

The fundamental object of the present invention is to provide a system for exerting a measurable force of variable magnitude.

A still further object of the present invention is to provide a force measuring system having increased accuracy capabilities.

More specifically, the object of the present invention is to provide a force measuring system which is capable of continually measuring a force of fluctuating magnitude with great accuracy.

Still more specifically, the object of the present invention is to provide a force measuring system utilizing in combination a plurality of transducers of different predetermined force outputs to counterbalance and thereby measure a force.

A further object of this invention is to provide a force measuring system which has increased stability in the presence of environmental changes such as temperature and therefore has increased accuracy under varying operating conditions.

Another object of the present invention is to provide a means for establishing a highly stable and accurately reproducible reference potential which compensates for environmental changes such as temperature.

Another object of the present invention is to provide a voltage supply of constant magnitude which will remain constant despite fluctuating load conditions thereon without appreciably affecting the system which establishes the magnitude of the voltage.

Another object of the present invention is to provide a force measuring system having a signal output in digital form.

An object of the present embodiment of the present invention is to provide a force measurement system especially adapted for continuously measuring the instantaneous acceleration of a prime structure or vehicle.

In accordance with the present invention, the counterbalancing force last mentioned is exerted upon an unbalanced beam by means of a number of transducers for converting electrical energy to mechanical energy, each of which, in the present disclosure, takes the form of a common capacitor composed of two parallel plates. When energized, each transducer exerts a rated or predetermined torque due to electrostatic force on the unbalanced beam. Each transducer exerts a torque different in magnitude from that of all other transducers and by selecting the proper combination of transducers having different torque ratings, any force within a given design range can be counterbalanced and, consequently, measured by simply summing the rated torques of the transducers required to be energized in order to maintain the unbalanced beam in null position. By designing the individual transducers to exert torques in the ratio of 1, 2, 3, and 5 for each power of ten within the desired range of measurement, a digital output is obtained for summation of the total torque applied, as will hereinafter be explained in detail.

The approximate expression for the electrostatic force of attraction between two equal areas, parallel plate, conducting surfaces is set forth to illustrate the various factors affecting the force between the two conducting plates of a capacitive electrostatic transducer. The expression is $$F \alpha \frac{KAE^2}{S^2}$$

where F is the force of attraction between the plates. Thus the force of attraction may be increased by increasing the plate area A, the potential difference E between the two plates, and the magnitude of the dielectric constant K, or by decreasing the spacing S between the plates. As stated above, each electrostatic transducer is to exert a constant, highly accurate, rated torque on the unbalanced beam, and the overall accuracy of the force measuring system primarily depends upon maintaining this constant torque each time a transducer is energized. The plate area A and the dielectric constant K are set by physical construction of the transducers. A constant and stable potential difference E is maintained by coaction of a voltage reference system and voltage isolation system, both of which are hereinafter more fully explained. In the embodiment described herein the spacing between the plates S is maintained constant by a null detector device and automatic servo devices which select and energize the proper combination of transducers which will exactly maintain the beam in a reference or null position.

Additional objects and advantages will occur to those skilled in the art upon a reading of the following detailed description of the chosen embodiment wherein:

Fig. 1 is a schematic perspective and circuit diagram of a device in accordance with the present invention;

Fig. 2 is a side view schematic of the voltage reference beam balance of Fig. 1 and related circuitry;

Fig. 3 is a side view schematic of the acceleration detecting beam balance of Fig. 1 and related circuitry; and Fig. 4 is a circuit diagram for one of the several selector switches of Fig. 1.

For purposes of this disclosure, an accelerometer has been chosen as the embodiment of the present invention. The accelerometer is comprised of three principal subsystems: the acceleration detecting, counterbalancing and measuring subsystem; the voltage isolation subsystem; and the voltage reference subsystem. The latter two subsystems combine to supply a stable reference voltage for the first subsystem. The voltage reference subsystem utilizes an electrostatic transducer to convert a mechanical reference force into a reference electrical source or voltage, which voltage, as outlined above, is required to be accurately stabilized to insure that the electrostatic balancing transducers of the acceleration measuring subsystem always exert their rated torque. The voltage isolation subsystem compares the reference voltage produced by the reference subsystem with the potential of the voltage supply and automatically adjusts the voltage supply potential to that of the reference voltage.

Referring to Fig. 1, the acceleration measuring subsystem is defined by the dashed boundary line 50. Pivots 53 are attached to the prime structure and support balance beam 51 which has a concentrated mass 52 at one end. The concentrated mass is of greater mass than the beam extending opposite the pivot axis so that an overall unbalanced beam is provided. The disclosed device is best suited to measure component acceleration forces in the vertical direction. However, by replacing the force of gravity by some other force, such as a spring, the balance can be used to measure component forces acting in any direction. The beam 51 is fabricated of an electrical conducting material and is grounded through pivots 53. A pair of sending elements 54 and 55 are disposed on opposite sides of beam 51. The sensing elements are also fabricated of conductive material and each element constitutes a plate of a capacitor so that a pair of parallel plate capacitors are formed with the beam 51 serving as a capacitor plate common to both capacitors. Leads from the sensing elements 54, 55 are connected to detector and demodulator 56. Detector 56 employs a bridge circuit which senses by comparison any change in potential across the capacitors formed by sensing elements 54, 55, which change would result from movement of beam 51. Bridge circuitries which compare and detect differences in potentials are well known to those skilled in the art and are typified by the well known Wheatstone bridge. Any unbalance on the bridge circuit is fed to amplifier 57. The output from the amplifier drives servo-motor 58. The motor 58 operates eight selector switches $S_0$ thru $S_7$. However, only $S_0$, $S_6$, and $S_7$ are shown for convenience of illustration. The selector switches energize the plurality of transducers by connecting the energizing voltage $V_e$ carried by lead 61 to plates C. The position of each switch S is fed to digital computer 59 as diagrammed.

The plurality of plates designated C having various number subscripts are fabricated of a conductive material and are disposed parallel to the beam 51. Each plate C forms a separate parallel plate capacitor when taken in conjunction with the beam 51. In the present embodiment, these capacitors constitute the counterbalancing and measuring electrostatic transducers referred to previously. A single electrostatic transducer properly comprises a pair of spaced apart, conductive elements. As illustrated, beam 51 constitutes a common conductive element for all transducers. It will be understood, however, that in place of a common conductive element, beam 51 could be constructed so that each plate C would have a corresponding element preferably of equivalent size mounted on the beam and insulated from all others, if desired. Hereafter, in both the specification and appended claims, a reference to a transducer C will be taken to mean the plate C acting in combination with the parallel portion of beam 51 as a single capacitive electrostatic transducer. Each transducer exerts a predetermined torque by means of electrostatic force of attraction on the beam 51 for each of a plurality of states of electrical energization, which are in the instant case zero potential and $V_e$ potential. The subscript for each plate C represents the torque that particular transducer exerts when energized according to the formula $C_{tu}=10^t \times u$ units of torque. Therefore transducer $C_{01}$ exerts a torque of unit magnitude ($10^0 \times 1$ unit). The transducer $C_{75}$ exerts $10^7 \times 5$ units of torque. Only the transducers exerting torques corresponding to $10^0$, $10^6$, and $10^7$ each multiplied by 1, 2, 3, and 5 are shown. The plates which exert torques of $10^1$, $10^2$, $10^3$, $10^4$, and $10^5$, times 1, 2, 3, and 5 units are omitted for convenience in illustration. It will be appreciated that only four plates for each power of ten represented by $t$ in the formula are required, because any whole number between 1 and 10 can be obtained by various combinations of numbers 1, 2, 3, and 5. From the above gradation of torque ratings, it will be obvious that any torque in unit intervals between zero and $10^8-1$ units magnitude can be exerted by various combinations of transducers energized to $V_e$ potential. In fact, if desired, it is possible to obtain a unit progression of torque output up to a torque corresponding to the total torque of all transducers acting concurrently by the use of appropriate selector switch circuitry (not shown). It is to be noted that only one energizing potential $V_e$ is used in the present system, other than zero potential. Nevertheless, by using only one stable reference voltage of reproducible magnitude to energize thirty-two transducers, $10^8-1$ different combinations of transducers and hence different counterbalancing torques are available. Of course, a plurality of reference voltages, each of stable, reproducible magnitude, could be used to greatly increase the number of transducer combinations available, or to allow the number of transducers to be reduced or varied, depending upon the range of forces to be measured and the accuracy of measurement desired. Generally speaking it is desirable to increase the number of transducers rather than the number of reference voltages because it is more difficult to establish reference voltages than to construct transducers of a desired force output. But this is limited as a practical matter by the size beam which can be constructed. It should be borne in mind that the controlling factor is merely that each transducer must exert a force of predetermined magnitude for each state of energization.

Fig. 4 is a circuit diagram of a single selector switch, for example, $S_0$. There are eight selector switches, one for each group of four transducers C having a common subscript $t$. Therefore, the subscript $t$ in the expression $S_t$ corresponds to the subscript $t$ in the expression $C_{tu}=10^t \times u$. Thus $S_0$ is the selector switch for the group of transducers $C_{01}$, $C_{02}$, $C_{03}$, and $C_{05}$. Reference $L_0$ designates the four leads connecting switch $S_0$ with transducer group $C_0$. References $L_6$ and $L_7$ likewise designate leads interconnecting switches $S_6$ and $S_7$ and transducer groups $C_6$ and $C_7$, respectively. $S_1$ (not shown) is the selector switch for the group $C_{11}$, $C_{12}$, $C_{13}$, and $C_{15}$ and so on until finally $S_7$ is the selector switch for group $C_{71}$, $C_{72}$, $C_{73}$, and $C_{75}$. Rotating contactor arms 101, 102, and 103 are carried on shaft 100 and are always at corresponding number positions on dials X, Y, and Z, respectively. The circled numbers 1, 2, 3, and 5 correspond to the subscript $u$ in the formula $C_{tu}=10^t \times u$. Therefore, in the $10^0 \times u$ or units group of transducers $C_{0u}$, the circled number 1 is a lead to transducer $C_{01}$, circled number 2 a lead to $C_{02}$, etc. The three selector switches represented and the five omitted are of the same construction and wiring, that shown in Fig. 4 being representative of all eight. As the contactor arms progress through the number positions on the dials X, Y, and Z, it will be noted that the sum of the circled numbers contacted by the three arms corresponds to the number of the position. For example, in the position shown, 9, contactor 101 connects circled number 5, contactor 102 connects circled number 3, and contactor 103 connects circled number 1, a total of nine. In position 6, contactor 101 connects circled number 5 and contactor 102 connects circled number 1, with contactor 103 open. It follows from the above that as the contactors rotate or progress through the dial positions, the transducers are energized in various combinations to exert a unit progression of torques on the beam of from one to nine units. All selector switches $S_0$ thru $S_7$ are driven by motor 58. $S_0$ is driven directly by shaft 100. $S_1$ is geared to $S_0$ in a 1 to 10 ratio so that $S_0$ rotates ten times for each revolution of switch $S_1$. Switch $S_2$ is likewise connected to switch $S_1$ by gearing in a 1 to 10 ratio so that each time switch $S_2$ makes one revolution $S_1$ makes ten revolutions and switch $S_0$ makes 100 revolutions. The same 1 to 10 gear ratio exists between each successive selector switch. Therefore, a continuous unit progression from 0 to $10^8-1$ units of torque is obtained by simply rotating servo-motor 58. As stated, servo-motor 58 which is driven by the output signal from amplifier 57 is reversible so that the total torque exerted by the transducers on the beam can be either increased or decreased, depending upon the direction of unbalance in the bridge circuitry of detector 56.

Although a particular selector switch circuitry and gearing arrangement has been disclosed, it is to be understood that any switch arrangement which is capable of energizing the various transducers in all combinations necessary to produce a unitary or other desired progression of torques over the design range can be substituted for that shown without departing from the present invention. For example, it may be desirable to use a servo-motor for each switch which can, if the change in acceleration is abruptly large, be rotated simultaneously to quickly restore the beam to the reference position. The type of selector switch system to be chosen is dictated by the range of forces to be measured and the frequency and magnitude of the fluctuations contemplated to be encountered.

The voltage reference subsystem is defined by dashed boundary line 70. The purpose of the system is to establish a stable, highly accurate voltage in the repetitive sense. That is, the voltage must remain constant throughout each use and also must be precisely reproduced within chosen error limits for each successive use of the system. Pivots 72 support beam 71. Beam 71 is fabricated of an electrically conductive material. The beam 71 is constructed so as to be substantially balanced about pivots 72 to prevent acceleration forces from affecting the position of the beam to any appreciable extent. A reference spring 73 interconnects the beam and the support structure for the system and exerts a constant mechanical force on the beam balance 71. A dashpot damper 74 prevents excessively abrupt movement of the beam, thereby increasing the time constant and accuracy capability of this subsystem. A pair of sensing elements 75 and 76 are positioned on opposite sides of beam 71. The sensing elements are fabricated of electrically conductive material and constitute, in combination with beam 71, a pair of parallel plate capacitors of the same form and which function in the same manner as the sensing elements 54 and 55 of the acceleration measuring subsystem previously described. Any departure of the beam 71 from the null or reference position will cause a relative change in potentials across the two sensing capacitors due to change of spacing, the potential of one increasing and the other decreasing. The relative difference in potential is detected by an unbalance in a bridge circuit of detector and demodulator 77. The difference in voltage in the detector 77 is fed to amplifier 78, and the amplified output drives servo-motor 79. Servo-motor 79 adjusts the plate spacing of variable capacitor 80 in a manner hereinafter described. Plate 82 is fabricated of an electrically conductive material and together with beam 71 comprises a capacitive electrostatic counter-balancing transducer. The purpose of this transducer is to use the stability of a reference mechanical force (exerted by reference spring 73) to establish and stabilize the magnitude of an electrical potential, which magnitude will remain constant during and for repeated uses of the system. So long as the voltage $V_r$ across the transducer formed by plate 82 and beam 71 is of the proper reference magnitude, the transducer exerts a torque on the beam which exactly counterbalances the spring force and maintains the beam in the reference or null position. Should the voltage $V_r$ change for any reason, the torque exerted by the transducer changes and the beam 71 departs from the null position. The change in spacing between the sensing elements 75 and 76 and the beam 71 causes a voltage unbalance in the bridge circuitry of detector 77. The output from the detector is amplified and drives servo-motor 79 in a manner to adjust variable capacitor 80 in the direction to restore the voltage $V_r$ across the transducer to the proper reference potential and thereby maintain the beam in the null position. The magnitude of the voltage $V_r$ therefore is maintained constant and constitutes the reference voltage for the entire accelerometer system. The capacitor formed by the beam 71 and plate 82 is therefore an electrostatic transducer used in a manner to convert the reference mechanical force of the spring into the reference electrical energy or potential $V_r$.

The voltage isolation subsystem is defined by dashed boundary line 90. Lead 91 feeds the reference voltage $V_r$ established by the voltage reference subsystem into amplifier 92. The supply voltage $V_s$ passes through variable capacitor 94 and is fed to amplifier 92 as $V_e$, the same voltage which energizes the counterbalancing transducers of the measuring system. Amplifier 92 compares the reference voltage $V_r$ with the energizing voltage $V_e$ and any difference is amplified and drives servo-motor 93 in a direction to adjust the spacing in the variable capacitor in a manner to bring $V_e$ to the same magnitude as $V_r$. The energizing voltage $V_e$ is simultaneously fed through parallel lead 61 to the selector switches $S_0$, $S_1$, etc. Therefore, as the load of the circuit energized by $V_e$ fluctuates due to action of the selector switches, the isolation system compensates and adjusts the voltage $V_e$ to correspond to the reference voltage $V_r$, thereby providing a substantially stable energizing voltage which is essential to the overall accuracy of the force measuring system. Yet the load fluctuations in the measuring subsystem are largely isolated from the reference voltage subsystem, thereby permitting a reference subsystem design having a longer time constant and hence greater accuracy. Either alternating or direct current can be used for $V_r$ and $V_e$ which are the two voltages which produce electrostatic balancing torque. If alternating current is used, filters should be interposed between the voltage source and the variable capacitors 80 and 94 to eliminate undesirable frequencies.

In order to reduce the magnitude of the load fluctuations on the isolation subsystem, dummy load circuitry can be employed. For example, the selector switch system ($S_0$ thru $S_7$) can be used to alternately connect either the transducer C or equivalent dummy loads so that the load on the circuit between variable capacitor 94 and the ground at pivot 53 will remain substantially constant. Dummy load circuitry to accomplish this purpose is considered within the purview of those skilled in the art and a matter of engineering design choice. Such circuitry would permit an isolation system design having a longer time constant and hence greater accuracy.

It is to be understood that the sensing elements, detectors, amplifiers, servo-mechanisms, computers, etc. are all operated by energy sources separate from the reference voltage $V_r$ and the energizing voltage $V_e$ so as not to affect the stability of these potentials. These energy sources are of conventional design, are within the purview of those skilled in the art, and do not constitute a part of the present invention. Accordingly, they have been eliminated from the drawings for the sake of simplicity of illustration.

Having explained the operation and cooperation of the voltage reference subsystem and the voltage isolation subsystem to produce an energizing potential $V_e$ of stable and reproducible magnitude, the acceleration measuring subsystem utilizes this energizing voltage and functions as follows. The unbalanced beam 51 is sensitive to acceleration forces in a direction normal to the pivot axis and normal to the axis of the beam. A change in the magnitude of the force acting on the beam will tend to displace the beam from the reference null position. Displacement of the beam from the null position results in a change in the spacing between the beam 51 and the sensing elements 54 and 55. This change in spacing causes a relative difference in the voltage across the two sensing capacitors and this difference in voltage is detected by an unbalance in the bridge circuitry of the detector 77. The difference in voltage is then fed into amplifier 57 and the amplified output drives servo-motor 58. Servo-motor 58 rotates the bank of selector switches $S_0$ thru $S_7$ which are connected by gearing as previously described in a direction of rotation to either increase or decrease the total torque exerted by the counterbalancing transducers to restore the beam 51 to the reference null position. The selector switches connect the energizing voltage $V_e$ to the capacitive transducer plates $C_{tu}$. Since each counterbalancing transducer exerts a predetermined rated torque when energized to potential $V_e$ and the total counterbalancing torque exerted on the beam 51 is the sum of the individual torques of the transducers within the superposition error hereafter defined, the position of each selector switch is fed to a digital computer 59 where the total torque being counterbalanced can be computed by mere summation of the numbers of the selector switch positions. Since the dimensions of the beam 71 and the mass unbalance are known, the computer can give a readout in acceleration units. Of course, the instantaneous torque can be recorded with respect to time for use in the integral formula previously set out for computing the distance traveled, or the computer can receive other data and directly indicate distance traveled in the sensitive direction.

One embodiment of the accelerometer is considered capable of measuring accelerations in the range from 0 to 2000 cm./sec.² with a sensitivity of $10^{-4}$ cm./sec.². This range does not require the use of transducers $C_{72}$, $C_{73}$, and $C_{75}$ which if used would increase the range up to 10,000 cm./sec.². When excluding the three biggest transducers, the accelerometer had the following design characteristics: the static friction torques of pivots 53 and 72 were each 1 dynecentimeter; the area of the reference transducer capacitor plate 82 was 50 square centimeters; the total area of the counterbalancing transducer plates C was 50 square centimeters; the spacing between sensing capacitor elements 54, 55 and 75, 76 was 0.002 centimeter and beam displacements of $3.5(10^{-9})$ centimeters were detectable; the spacing of all other capacitive transducers was 0.002 centimeter; the effective moment arms of the combined transducers C, the effective mass unbalance 52, the reference voltage transducer 82, and the reference spring 73 was each 5 centimeters relative to their respective pivot axes; the dielectric constant for all capacitors was unity; the effective unbalanced mass 52 was 2,000 dynes/cm./sec.²; the reference potential was 850 volts; the force exerted by reference spring 73 at null position was $4(10^6)$ dynes; and the spring constant of reference spring 73 is $0.5(10^8)$ dyne/centimeter. It will be appreciated that all of the above data concerns only one specific embodiment of the present invention and that each of the mentioned factors may vary in magnitude to a large extent and in relation to each other, such as, for example, the area and position of the capacitor plates and the magnitude of the voltages.

In Ingeniors Vetenskaps Akademien, Nr 146, A. Lindblad and D. Malmqvist, Stockholm 1938, it is reported that by using capacitive transducers in the analogue manner, i.e., using a single capacitor and varying the potential to obtain a varying counterbalancing torque, variations in the force of the earth's gravity in the order of 0.01 milligal can be detected with a practical single reading accuracy of 0.05 milligal (1 gal.=1000 milligals=980.66 cm./sec.²=standard acceleration of gravity). Thus it will be seen that the instant apparatus has a sensitivity (0.0001 cm./sec.²) approaching 0.01 that of the Lindblad and Malmqvist device (0.0098 cm./sec.²).

The measurement balance and the reference balance should be placed physically in relatively close proximity and preferably in a common evacuated chamber to reduce sparking. It should be noted that the transducers of the measurement subsystem and those of the reference voltage subsystem should be of approximately the same construction and approximately the same total transducer area, and should be fabricated of the same material. Because of this similarity, measurement errors due to uncompensated conversion factor changes are eliminated. For example, if the conversion factor of the reference transducer 82 is reduced because of a change in temperature, the derived electrical reference $V_r$ will be increased in order to maintain the beam 71 in balance. $V_e$ will also be increased to the magnitude of $V_r$ by the isolation subsystem. However, if the measurement transducers $C_{tu}$ are physically near the reference transducer and constructed of the same material, they will experience the same temperature change and their conversion factor will also be reduced. Therefore the combination of increased energization voltage $V_e$ and reduced conversion factor compensate and the resulting output torques of the measurement transducers $C_{tu}$ will be the same as if no temperature change had occurred. Thus it will be appreciated that although the reference voltage subsystem has independent utility, that of establishing a potential of stable magnitude, it cooperates with the other subsystems of the accelerometer in a manner to contribute to the ultimate overall measurement accuracy of the system.

Sensing elements 54, 55 and 75, 76 should be constructed so as to exert a negligible force upon the beam balances by reason of electrostatic force. The pivots 53 and 72 should have as low a static friction torque as possible to reduce the required mass of the balance beams and thereby increase the sensitivity of the system. The beams 51 and 71 should be constructed with a view to the adverse effect on measurement accuracy that flexure of the beams will produce due to resulting variations in the spacing of the transducers. The plates $C_{tu}$ should be rigidly attached to the supporting structure to avoid spacing variations.

Fig. 1 shows the measurement beam 51 and the reference beam 71 oriented in the same plane. This is not essential. The reference beam can be, for example, suspended by one edge from a vertically descending wire which also can provide the reference torque by torsion within the wire. The same arrangement could be used for supporting the measuring beam if the component of acceleration to be measured is in a horizontal direction. The torque exerted by the suspending wire would replace the force of gravity in the disclosed beam balance case.

It is required that the torque exerted by each energized measuring transducer, when any possible combination of the other transducers is energized, be negligibly different from the torque exerted by that transducer when it alone is energized. Thus, superposition error is herein defined as the difference between the total torque exerted by any given combination of energized transducers and the sum of the torques exerted by each transducer when energized individually. Superposition error is due to fringe flux, etc., and may be reduced within allowable error limits by such factors as increasing the spacing between adjacent plates, $C_{05}$ and $C_{03}$ for example, or providing insulating rings around the plates. Or, as previously mentioned, the beam 51 can be constructed so as to provide a corresponding plate for each plate C, and the beam plates could be insulated one from the other.

Although electromagnetic transducers could be employed, electrostatic transducers have the advantage of being comparatively free of the hysteresis and drift errors which are common with the former. The use of electrostatic transducers also has the advantage that matching of the transducers can be achieved reasonably simply and accurately and therefore permit the compensating conversion factor principle previously discussed to be used to great advantage. The problem of matching transducer elements can be reduced to matching coefficients of expansion, matching moduli of elasticity, and matching dielectric constants, whereas the problem of matching electromagnetic elements includes matching magnetic characteristics. Further, the time constants associated with electrostatic transducers may be reduced to a considerably smaller value than that of electromagnetic transducers. Reduction of transducer time constants results in measurement systems which are capable of accurately measuring forces which fluctuate at relatively high rates, or measuring forces which fluctuate at low rates with more accuracy than might otherwise be obtained.

I claim:

1. A device for continuously counteracting a force of fluctuating magnitude comprising a plurality of transducers for converting electrical energy to mechanical energy, each transducer having a pair of spaced apart elements, a first set of elements comprised of one element from each transducer attached to a member displaceable by the force to be counteracted, a second set of elements comprised of the other element from each transducer attached to a support structure, sensing means for detecting the position of said first set relative to a reference position, and automatic means responsive to said sensing means for selectively energizing said transducers until a combination of transducers is energized which exerts a total force which will maintain said first set in the reference position.

2. A device for continuously counteracting a force of fluctuating magnitude as set out in claim 1 wherein said plurality of transducers are electrostatic transducers having a pair of spaced apart conductive elements.

3. An accelerometer comprising a plurality of transducers each having a pair of spaced apart elements, a first set of elements comprised of one element from each transducer connected to a pivoted member adapted to move responsive to an acceleration force to be measured, a second set of elements comprised of the other element from each transducer rigidly attached to a structure the acceleration of which is to be measured, a first sensing means including means for detecting and providing an output based on the position of said first set relative to a reference position, means for establishing at least one reference potential of stable reproducible magnitude for which the force of attraction between said transducers is known, at least one energy source, means for automatically and continually adjusting the potential of an energy source to that of each reference potential established, an amplifier to amplify the sensing means output signal and to actuate switching means, said switching means selectively energizing said transducers in various combinations to a stable state for which the force of attraction between the elements is known until the force between said first set and said second set counteracts the acceleration force acting on said first set and maintains the first set in reference position, and means for summation of the forces acting between said first and second sets.

4. An accelerometer as set out in claim 3 wherein said sensing means includes two capacitors each comprised of a pair of conductive elements, one element of each capacitor attached to said pivoted member, the other element of said capacitors spaced apart from said pivoted member and on opposite sides thereof, and balanced circuit means for detecting a difference in the magnitude of the potentials of said capacitors.

5. An accelerometer as set out in claim 3 wherein said means for establishing at least one reference potential comprises for each reference potential established a first plate, mechanical means for exerting a constant force on said first plate; a second plate spaced apart from said first plate and attached to said structure; an energy source, a variable capacitor, said second plate and said first plate connected in series; a second sensing means for detecting the departure of the first plate from a reference position; means responsive to a signal from said second sensing means for adjusting said variable capacitor in a manner to alter the potential across said first and second plates in a direction to restore said first plate to the reference position, and leads connected in parallel with said first and second plates for supplying an established reference potential of stable and reproducible magnitude.

6. An accelerometer as set out in claim 3 wherein said means for automatically and continually adjusting the potential of an energy source to that of each reference potential comprises a variable capacitor connected to the corresponding energy source, an amplifier having a bridge circuit connected to compare the potential across said variable capacitor and the corresponding reference potential, said amplifier providing an amplified output based on the difference in the compared potentials, and means responsive to the amplified output of said amplifier for varying said capacitor in a manner to adjust the potential across the capacitor to that of the reference potential, and means for connecting the adjusted source potential in series with said variable capacitor.

7. An accelerometer comprising a plurality of electrostatic transducers each having a pair of spaced apart conductive elements, a first set of elements comprised of one element from each transducer connected to an unbalanced pivoted member, a second set of elements comprised of the other element from each transducer attached to a structure the acceleration of which is to be measured, each transducer exerting a torque of known magnitude on said pivoted member for each of a plurality of stable and reproducible states of electrical energization due to the electrostatic force between said pair of elements, said transducers exerting torques of different magnitudes whereby various combinations of transducers energized to various ones of said stabilized states are capable of producing a unitary progression of torques on said pivoted member, means for establishing at least one reference potential of stable, reproducible magnitude other than zero potential across each transducer, a first sensing means for detecting the position of said pivoted member relative to a reference position, amplifying means for amplifying the output of said sensing means to actuate switching means, said switching means selectively energizing said transducers in various combinations to various states of energization for which the magnitude of the torque exerted on the pivoted member is known until the pivoted member is returned to the reference position, and means for summation of the total torque exerted by the transducers to maintain the pivoted member in reference position.

References Cited in the file of this patent

UNITED STATES PATENTS

| | | |
|---|---|---|
| 1,112,196 | Creveling | Sept. 29, 1914 |
| 1,118,333 | Creveling | Nov. 24, 1914 |
| 1,465,500 | Vance | Aug. 21, 1923 |
| 2,243,749 | Clewell | May 27, 1941 |
| 2,316,915 | Truman | Apr. 20, 1943 |
| 2,680,012 | Bozoian | June 1, 1954 |
| 2,733,911 | Thurston | Feb. 7, 1956 |
| 2,809,524 | Masterson | Oct. 15, 1957 |
| 2,814,768 | Kinkel | Nov. 26, 1957 |
| 2,819,054 | Thorsson | Jan. 7, 1958 |
| 2,899,190 | Driver | Aug. 11, 1959 |

FOREIGN PATENTS

| | | |
|---|---|---|
| 715,750 | Great Britain | Sept. 22, 1954 |
| 34,891 | Netherlands | Mar. 15, 1935 |